United States Patent
Mower et al.

(10) Patent No.: US 7,221,665 B1
(45) Date of Patent: May 22, 2007

(54) SYSTEM AND METHOD FOR PN ENCODED SIGNAL PRIORITIZATION AND COLLISION MITIGATION

(76) Inventors: Vaughn L. Mower, L-3 Communication Systems - West, PO Box 16850, Salt Lake City, UT (US) 84116; Merle L. Keller, L-3 Communication Systems - West, PO Box 16850, Salt Lake City, UT (US) 84116

( * ) Notice: Subject to any disclaimer, the term of this patent is extended or adjusted under 35 U.S.C. 154(b) by 899 days.

(21) Appl. No.: 10/458,430

(22) Filed: Jun. 9, 2003

(51) Int. Cl.
    *H04B 7/216* (2006.01)
(52) U.S. Cl. .................. 370/335; 370/337; 375/150
(58) Field of Classification Search ............... 370/335, 370/337, 342, 347; 375/148, 150
    See application file for complete search history.

(56) References Cited

U.S. PATENT DOCUMENTS

| | | | |
|---|---|---|---|
| 6,389,066 B1 | 5/2002 | Ejzak | |
| 6,407,993 B1 | 6/2002 | Moulsley | |
| 6,452,964 B1 | 9/2002 | Yoshida | |
| 6,704,347 B1* | 3/2004 | Miura | 375/150 |
| 2004/0121754 A1* | 6/2004 | Tenda | 455/334 |
| 2006/0083292 A1* | 4/2006 | Khayrallah et al. | 375/148 |

* cited by examiner

*Primary Examiner*—Lee Nguyen
(74) *Attorney, Agent, or Firm*—Kevin P. Correll (57) ABSTRACT

A system for TDMA-SS signal prioritization and collision mitigation is provided. The system includes a Hub transceiver having plurality of parallel PN correlation branches, wherein each of the plurality of parallel PN correlation branches is prioritized with respect to each of the other plurality of parallel PN correlation branches. The system also includes a first Spoke transmitter adapted to transmit a first prioritized PN encoded signal corresponding to a first one of the first plurality of prioritized parallel PN correlation branches. In addition, a second Spoke transmitter is adapted to transmit a second prioritized PN encoded signal corresponding to a second one of the first plurality of prioritized parallel PN correlation branches.

17 Claims, 5 Drawing Sheets

SYSTEM AND METHOD FOR PN ENCODED SIGNAL PRIORITIZATION AND COLLISION MITIGATION

CROSS REFERENCE TO RELATED APPLICATIONS

U.S. patent application Ser. No. 10/619,864, entitled "System And Method For Priority Communication Management In A Hybrid TDMA-SS System" filed Jul. 14, 2003. The disclosure of this Non-provisional Patent Application is incorporated by reference herein in its entirety to the extent it does not conflict with the teachings presented herein.

BACKGROUND OF THE INVENTION

1. Field of the Invention

This invention relates generally to communication systems using spread spectrum Pseudo-Noise (PN) coding techniques, and pertains more specifically to methods and systems for PN encoded signal prioritization and collision mitigation.

2. Prior Art

A variety of multiple access communication systems has been developed for transferring information among a large number of system users. Techniques employed by such multiple access communication systems include time division multiple access (TDMA), frequency division multiple access (FDMA), and AM modulation schemes, such as amplitude companded single sideband (ACSSB), the basics of which are well known in the art.

In Spread Spectrum (SS) or TDMA-SS transmission systems, a succession of short-duration bursts emanating from a number of different stations are presented to a demodulator. Each burst may contain data frames from one or more data channels. Each data frame generally contains a synchronization or sync word and a data payload area.

The TDMA structure is composed of a stream of frames with a number of fixed-time slots per frame. Each time slot may be of an assigned type: entry and registration, routine maintenance, priority messages, mass data transfer, and interrupt. The composition of slot types in a frame may be reassigned from frame to frame. A time slot in a frame may be assigned to one specific user; or a time slot may be a free-for-all slot; any number of users may attempt to use it on a first-come, first-serve basis.

Frequently, a class of users may need to communicate messages on an ad-hoc basis during a time slot that is reserved for ad-hoc messages, e.g., an interrupt time slot. The interrupt time slot is not assigned a priori to any specific user, but is available to all users on a free-for-all basis. For the case when multiple users occasionally transmit a message during the same interrupt time slot, the possibility exists that the different user transmissions will arrive nearly simultaneously at the receiver, thus "colliding" and interfering with each other. Prior art approaches design the spread spectrum correlation receiver to demodulate the received signal that arrives first in time and to reject other signals that are outside the correlation window of the correlation receiver. One disadvantage of this method is that higher priority messages from one user may be rejected in favor of lesser priority message from another user. Another disadvantage is that all messages received in the interrupt time slot may be rejected if multiple received spread spectrum signals arrive within the receiver's correlation window (e.g., within 2 PN code chips) of each other.

Therefore, a signaling method is desired that will enable interrupt message priority to be assigned to different users (i.e., Spokes) of the system and for the receiver (i.e., Hub) to automatically "sort" the messages in the correlation receiver to automatically select the highest priority message. Messages having lesser priority are thus automatically rejected in favor of a higher priority message.

SUMMARY OF THE INVENTION

The foregoing and other problems are overcome, and other advantages are realized, in accordance with the presently preferred embodiments of these teachings.

In accordance with one embodiment of the present invention a TDMA-SS signal prioritization system is provided. The system includes a Hub transceiver having a plurality of parallel PN correlation branches, wherein each of the plurality of parallel PN correlation branches is prioritized with respect to each of the other plurality of parallel PN correlation branches. The system further includes a first Spoke transmitter adapted to transmit a first prioritized PN encoded signal corresponding to a first one of the plurality of prioritized parallel PN correlation branches. The system also includes a second Spoke transmitter adapted to transmit a second prioritized PN encoded signal corresponding to a second one of the plurality of prioritized parallel PN correlation branches.

The invention is also directed towards a method for selecting a prioritized TDMA-SS signal. The method includes in at least one Spoke transmitter, Spoke prioritizing a TDMA-SS signal; and in a Hub receiver accumulating the prioritized TDMA-SS signal. Accumulating the prioritized TDMA-SS signal includes delaying the prioritized TDMA-SS signal by a PN chip or a specified offset in chips; despreading the PN chip delayed prioritized TDMA-SS signal; and determining a detection threshold. The method also compares the accumulated prioritized TDMA-SS signal to the detection threshold and determines a priority of the accumulated prioritized TDMA-SS signal in accordance with a result of the comparison.

In accordance with another embodiment of the present invention a program storage device readable by a machine, tangibly embodying a program of instructions executable by the machine to perform method steps for generating TDMA-SS signal prioritization and collision mitigation is provided. The method includes in at least one Spoke transmitter, Spoke prioritizing a TDMA-SS signal; and in a Hub receiver accumulating the prioritized TDMA-SS signal. Accumulating the prioritized TDMA-SS signal includes delaying the prioritized TDMA-SS signal by a PN chip or a specified offset in chips; despreading the PN chip delayed prioritized TDMA-SS signal; and determining a detection threshold. The method also compares the accumulated prioritized TDMA-SS signal to the detection threshold and determines a priority of the accumulated prioritized TDMA-SS signal in accordance with a result of the comparison.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENT

Figure 1:
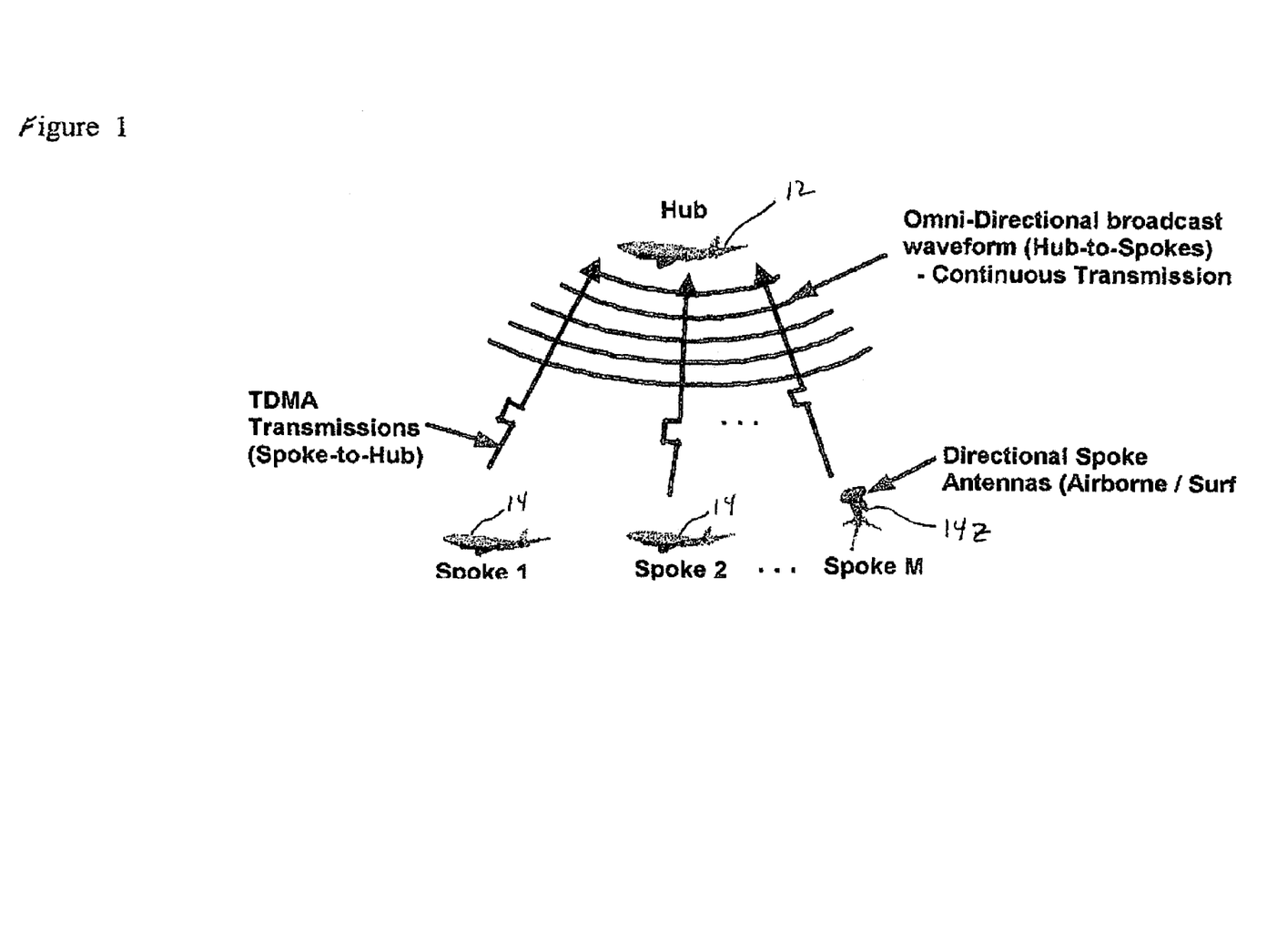
FIG. 1 is a pictorial diagram of a Hub-Spoke system architecture incorporating features of the present invention.

Referring to FIG. 1, there is shown a pictorial diagram of a HUB 12-SPOKE 14 telecommunications system incorporating features of the present invention. Although the present invention will be described with reference to the embodiment shown in the drawings, it should be understood that the present invention might be embodied in many alternate forms of embodiments, e.g., point-to-point duplex links or point-to-multipoint links. In addition, it should be understood that the teachings herein may apply to any group or assembly of hybrid TDMA-SS receivers, including those that are fixed in place; vehicle mounted; and/or hand carried; as illustrated by 14z.

The Hub 12 transmits a continuous "broadcast" transmission waveform that is composed of a wideband direct sequence spread spectrum system composed of component PN codes (XYZ) described in copending patent application Ser. No. 10/352,295 entitled "Method and System for Rapid automatic Data Rate Discovery for PN Codes" filed Jan. 27, 2003 and incorporated herein in its entirety. The waveform is received, de-spread, and the underlying data is demodulated as taught by copending application Ser. No. 10/352, 295 by each Spoke 14 in the system.

Figure 2:
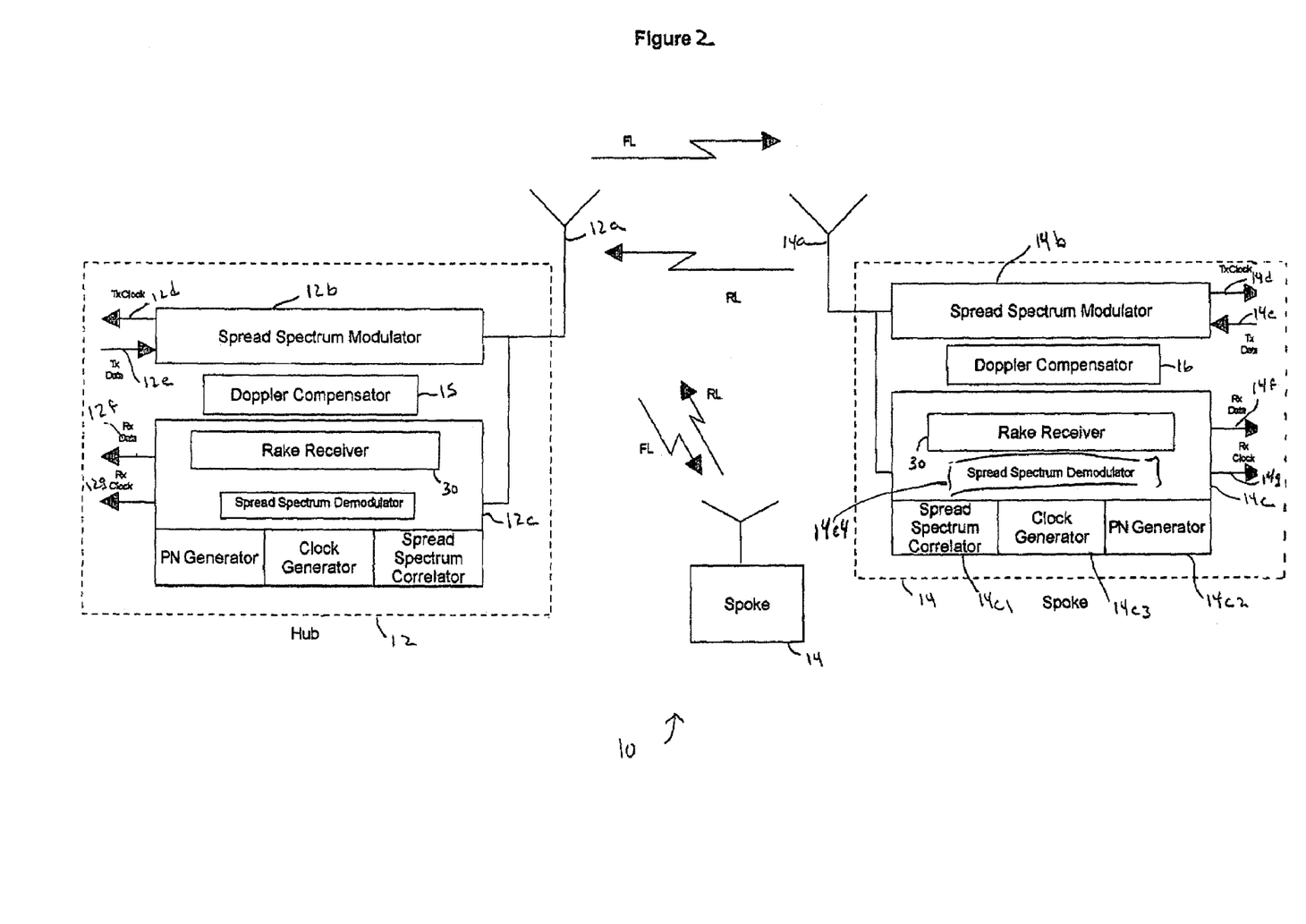
FIG. 2 is a block diagram of a hybrid TDMA-SS communication system incorporating features of the present invention shown in FIG. 1.

The Spoke(s) 14 derive the TDMA timing and slot structure from the Hub's 12 broadcast spread spectrum waveform PN code and from time slot definition tables transmitted from the Hub 12 to the Spokes 14 in the broadcast data (FIG. 2, FL). In a preferred embodiment of the present invention, the time of arrival and PN code phase of the transmitted TDMA spread spectrum signal is controlled to arrive at, referring also to FIG. 3, the Hub correlation receiver, item 30, within ±1 PN chip uncertainty. However, it will be appreciated that any suitable chip uncertainty may be used.

Still referring to FIG. 1, in a preferred embodiment, the Hub 12 assigns priorities to the Spokes 14. The priority for each Spoke is preferably unique such that collisions can be managed. For example, in a system 10 composed of M number of Spokes 14. Each Spoke 14 preferably has a unique pre-assigned priority "m=[1, 2 . . . M]", where "1" is the highest priority. The priority for each Spoke is transmitted from the Hub to the Spokes in the broadcast data and is contained in the Spoke's 14 respective time slot definition table.

Referring also to FIG. 2, there is shown a block diagram of a hybrid TDMA-SS communication system incorporating features of the present invention shown in FIG. 1. FIG. 2 shows a full-duplex system 10 that is suitable for practicing this invention. Specifically, the system 10 employs direct sequence spread spectrum based techniques over an air link to provide data transfer between HUB 12 and SPOKE 14. The forward link (FL) from HUB 12 to SPOKE 14 contains a spread spectrum waveform that is constructed in the manner described herein, with the PN code being composed of even-length and/or maximal length codes. In a similar manner, the return link (RL) from SPOKE 14 to HUB 12 contains a spread spectrum waveform that is similar, or identical, to that of the FL.

Still referring to FIG. 2, HUB 12 includes a Spread Spectrum Modulator (SSM) 12b; the SSM 12b generates a desired spread spectrum waveform at a desired RF frequency. The SSM 12b also provides a Tx clock 12d that is used to clock the Tx Data 12e into the SSM 12b. The SSM 12b then combines the Tx data 12e with a spread spectrum PN code to produce the desired spread spectrum waveform. HUB 12 also includes an antenna 12a, which may transmit at any suitable RF frequency.

The signal generated by HUB 12 and transmitted by antenna 12a via the FL is received by SPOKE 14 via antenna 14a. Spoke 14 includes a spread spectrum correlator 14c1, PN generator 14c2, clock generator 14c3, and spread spectrum demodulator (SSD) 14c4. The received signal is then demodulated by SSD 14c4. Once the signal is acquired and the SPOKE 14 is tracking the received signal, the Rx Clock 14g and Rx Data 14f are output to the intended receiver circuitry. It will be appreciated that the clocks 14g and 12d are synchronous and may be commanded to change frequency to correspond with PN code epochs as will be described herein; thus advantageously providing means to vary the data rate without interruption; and without the need for conventional bit synchronizers with associated synchronization time.

Figure 4:
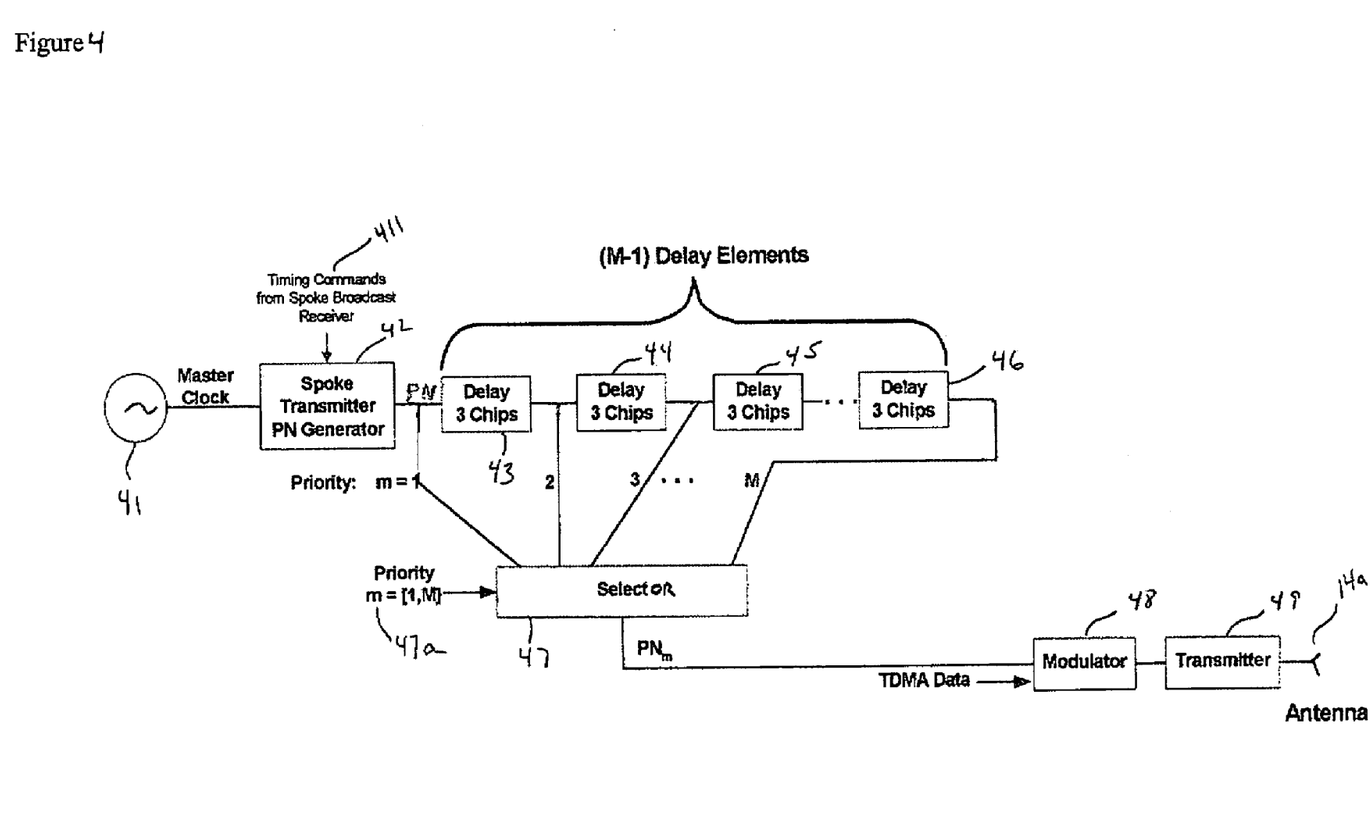
FIG. 4 is a block diagram detailing PN code tap delay element in accordance with spoke prioritization features of the present invention shown in FIG. 1.

Similarly, SPOKE 14 generates a Tx Clock 14d and Tx Data 14e using the Spread Spectrum Modulator 14b in a similar fashion described earlier for HUB. Likewise, HUB 12 may receive the RL signal via antenna 12a, and demodulate and track the signal as described earlier with receiver 12c to provide Rx Data 12f and Rx Clock 12g to the intended user. Referring to FIG. 4 there is shown a block diagram detailing PN code tap delay elements in accordance with spoke prioritization features of the present invention shown in FIG. 1. Referring to FIG. 2, during an interrupt time slot(s) (not shown), a Spoke 14 has a message to transmit, the Spoke 14 selects a transmitted PN code phase to correspond to the pre-assigned priority. The Spoke PN Generator 42 is shown with inputs consisting of a master clock 41, generally operating at the TDMA chipping rate, and timing commands 411 from the Broadcast Receiver (not shown). The timing commands include the information necessary to control the frequency and phase of the Spoke 14 transmitted PN code to arrive at the Hub 12 within an accuracy of ±1 chip in a preferred embodiment. The timing commands 411 also adjust for Doppler frequency between the Hub 12 and Spoke 14, and for master clock 41 drift.

The Spoke Transmitter PN Generator 42 receives as inputs a signal from Master Clock 41 and timing commands from Spoke Broadcast Receiver 411. The Spoke Transmitter PN Generator 42 may generate suitable PN codes such as taught in co-pending application Ser. No. 10/352,295 filed Jan. 27, 2003. The PN code from PN Generator 42 then passes to M−1 3-chip delay elements 43–46, where M is the number of Spokes in the HUB/SPOKE system (FIG. 1, item 10). The delay elements shown in FIG. 4 are preferably set at delays of 3 chips each to account for an uncertainty of ±1 chip and to allocate a 1 chip guard band. However, any suitable delay may be used. The PN code having passed through up to M−1 3-chip delays is selected by priority selector 47 based on input priority m 47a. The selected PN code with priority m is then modulated by modulator 48 and transmitted by transmitter 49, depicted in FIG. 4, to Hub 12 depicted in FIG. 1.

The delaying of the PN code may be expressed as:

$$\text{Delay}=(P-1)*(CD) \qquad \text{(Eq. 1)}$$

In equation 1, delaying of the PN code (Delay) is expressed as an integer variable representing priority (P) minus one, times an integer variable representing chip delay units (CD).

It will be appreciated that the number of delay elements (43–46) selected by each Spoke 14 is selected by selector 47 in accordance with priority assignment "m" from the Hub 12. In alternate embodiments, the Spoke 14 priority may be fixed, thus allowing the Spoke priority circuitry to be hardwired. For example, a Spoke 14 may be permanently assigned priority 2, thus obviating the need for chip delay units 44–46.

Figure 3:
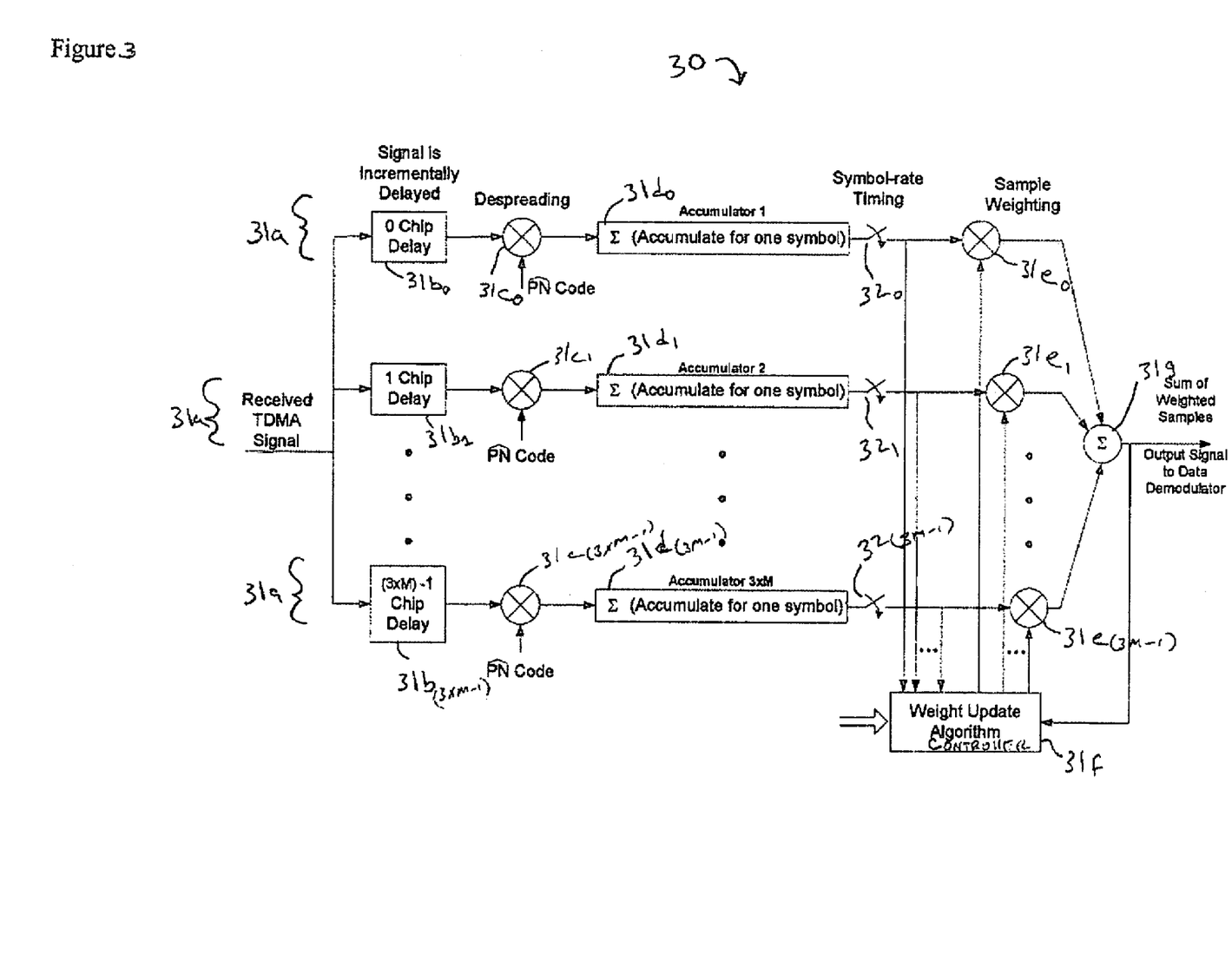
FIG. 3 is a block diagram showing parallel correlators (rake receiver) in accordance with fast acquisition features of the present invention shown in FIG. 2.

Referring now to FIG. 3 there is shown a block diagram of a correlation rake receiver 30 showing multiple correlator branches 31a in a parallel rake receiver architecture in accordance with the teachings of the present invention. Each correlator branch 31a includes a chip-delayer 31b, a PN despreader 31c, an accumulator 31d, a symbol rate timing selector switch 32, and a sample weighting controller 31e.

In a preferred embodiment the number of correlator branches 31a is 3 times M (M equaling the number of Spokes); in other words, three correlator branches 31a per Spoke. The TDMA-SS signal received from the Spoke(s) (FIG. 1, items 14) is chip delayed from 0 to 3M−1 chip delays by chip-delayers $31b_0$-to-$31b_{3M-1}$, respectively. During interrupt time slots, the symbol rate timing selector switches $32_0$–$32_{3M-1}$ send despread accumulated signals from accumulators $31d_0$–$31d_{3M-1}$ to the Weight Update Algorithm Controller 31f. Accumulator $31d_0$–$31d_{3M-1}$ outputs that do not exceed the detection threshold are discarded because there is insufficient signal correlation to be of interest. After the priority accumulator set is identified (see FIG. 5 and description below), the rake receiver 30 sample-weighting-taps for all other delay paths 31e are set to zero to discard other received signals having lesser priority. Sample weighted signals not set to zero are summed via summer 31g and output to a data demodulator. Thus, it will be appreciated that this arrangement advantageously complements the Spoke prioritization arrangement shown in FIG. 4. For example, in a two or more Spoke system, there is, according to FIG. 4, at least one 3-chip delay element (FIG. 4, item 43) in at least one Spoke. Thus, the transmitted signal may not be delayed at all, i.e., m=priority 1, and therefore, when received by the Hub 12 rake receiver 30, the within tolerance signal that is despread by one of the despreaders $31c_0$, $31c_1$, or $31c_2$ and accumulated by its corresponding accumulator $31d_0$, $31d_1$, or $31d_2$, will correspond to the signal received through chip delayers $31b_0$, $31b_1$, or $31b_2$. Likewise, continuing the example, a m=priority 2 message is chip delayed by 3 chips (FIG. 4, item 43). Thus, when received by the Hub 12 rake receiver 30, the within tolerance signal that is despread by one of the despreaders $31c_3$, $31c_4$, or $31c_5$ and accumulated by its corresponding accumulator $31d_3$, $31d_4$, or $31d_5$, will correspond to the signal received through chip delayers $31_{b3}$, $31_{b4}$, or $31_{b5}$.

The following numeric example further illustrates the prioritization and collision avoidance features of the present invention. Consider two transmitting Spokes 14, in a three Spoke system, having transmitting interrupt messages having priorities 2 and 3, respectively. Both transmitting Spokes 14 transmit such that their transmitted signals arrive at the Hub 12 with a PN code phase error that does not, in a preferred embodiment, exceed ±1 chip. The transmitted PN code phase for the priority 2 message is (2−1)×3=3 PN chip delays; hence, this signal will arrive at the Hub rake receiver 30 with a delay of 3±1 chips. In a similar manner for the priority 3 message, the transmitted PN code phase for the priority 3 message is (3−1)×3=6 PN chip delays; hence, this signal will arrive at the Hub receiver with a delay of 6±1 chip. The Hub correlation receiver 30 accumulators $31d_0$–$31d_8$ will get simultaneous detections at one of the accumulator sets $31d_3$–$31d_5$ and $31d_6$–$31d_8$. The accumulator set having the higher priority, in this example, accumulator set $31d_3$–$31d_5$, is selected by weight update controller 31f positively weighting the higher priority-2 signal (delayed by 3 chips) and rejecting, or zero weighting, the lower priority-3 signal (delayed by 6 chips) through sample weighting controllers $31e_6$–$31e_8$.

Thus, the signals from Spokes 2 and 3 do NOT collide in-phase, thus enabling reception of the higher priority signal from the higher priority Spoke. Thus, the Hub receiver advantageously avoids fatal message collisions such that neither priority message is received.

It will be appreciated that the number of correlation branches per set 31a per priority may be any suitable number corresponding to the system tolerance. For example, a communication system having a PN chip tolerance of plus or minus 4 chips would have 5 correlation branches per set 31a per desired priority.

Figure 5:
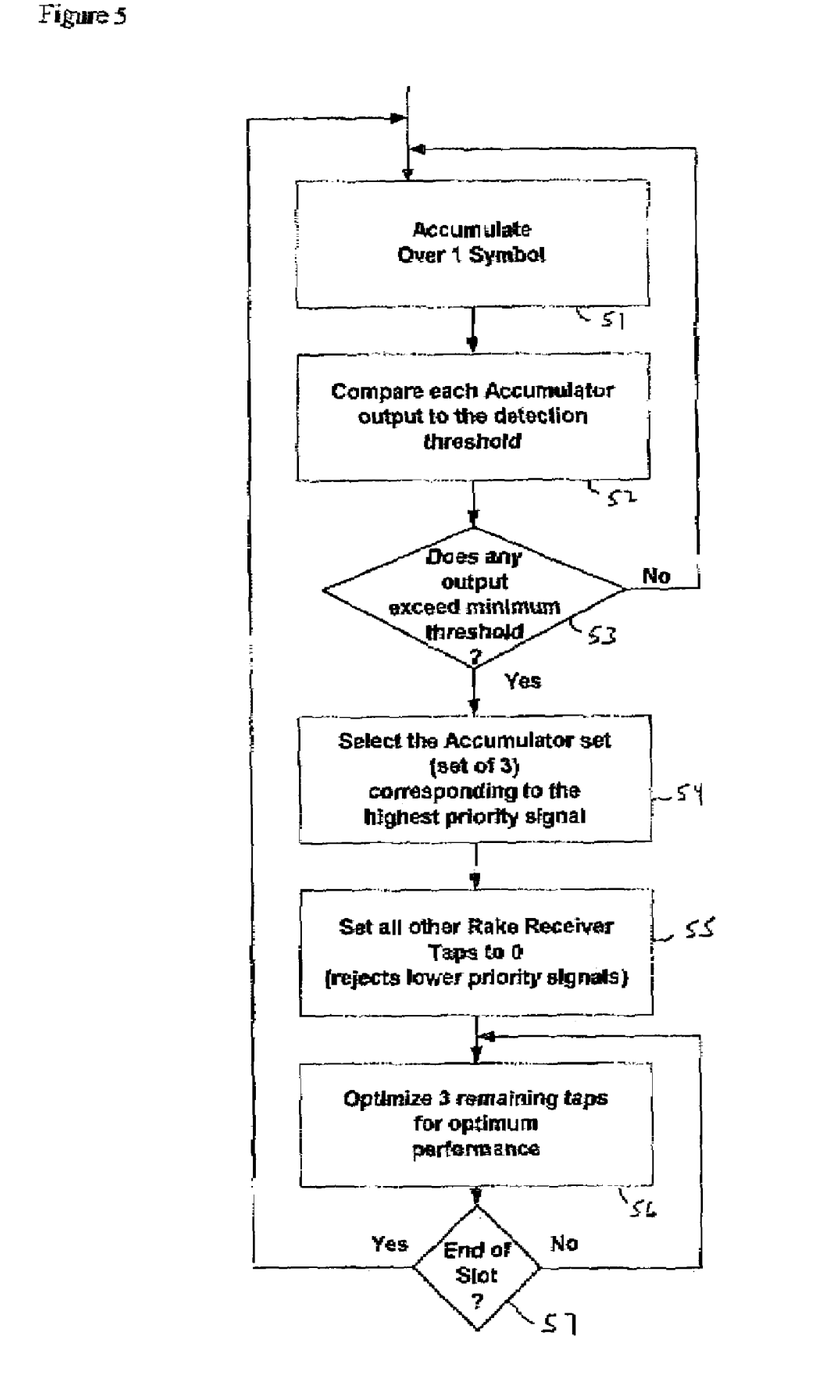
FIG. 5 is a method flow chart showing steps for one method of implementing priority selection features of the present invention shown in FIG. 3.

Referring also to FIG. 5 there is shown a method flow chart showing steps for one method of implementing the priority selection features of the present invention shown in FIG. 3. The first step 51 accumulates PN phase information over one symbol period. The next step 52 compares each accumulator $31d_0$–$31d_{3M-1}$ output to a detection threshold. A check, step 53 determines whether any accumulated output exceeds a predetermined minimum threshold. If the result of step 53 is negative then the process starts over at step 51; if the result of step 53 is positive then the 3-set correlation branch (FIG. 4, item 31a), in this example, corresponding to the desired priority signal is selected 54. The three taps exceeding the predetermined minimum threshold are optimized for performance, step 56. All other Rake Receiver Taps from weight update controller 31f are set to zero, step 55, thereby rejecting lower or non-desired priority signals. Finally, step 57 determines whether the end of the interrupt time slot has been reached.

In addition, in alternate embodiments features of the present invention may be implemented in a programmable device such as an integrated circuit (IC). It will be further appreciated that the IC may be a field programmable gate array (FPGA), an application specific IC (ASIC), or a function of Modulator, Demodulator, Controller (MDC) firmware. The operation of the ICs or firmware may be defined by a suitable programming language such as a Very High Speed Integrated Circuit (VHSIC) Hardware Description (VHDL) Language file. Accordingly, the present invention is intended to embrace all such alternatives, modifications and variances that fall within the scope of the appended claims.

What is claimed is:

1. A TDMA-SS signal prioritization system, the system comprising:
   a Hub transceiver, wherein the Hub transceiver comprises:
      a first plurality of parallel PN correlation branches, wherein each of the first plurality of parallel PN correlation branches is prioritized with respect to each of the other first plurality of parallel PN correlation branches;
   a first Spoke transmitter, wherein the first Spoke transmitter is adapted to transmit a first prioritized PN encoded signal corresponding to a first one of the first plurality of prioritized parallel PN correlation branches; and
   a second Spoke transmitter, wherein the second Spoke transmitter is adapted to transmit a second prioritized PN encoded signal corresponding to a second one of the first plurality of prioritized parallel PN correlation branches.

2. A TDMA-SS signal prioritization system as in claim 1 wherein each of the first plurality of parallel PN correlation branches further comprise a second plurality of parallel PN correlation branches, wherein each of the second plurality of parallel PN correlation branches is associated with a predetermined PN phase tolerance.

3. A TDMA-SS signal prioritization system as in claim 2 wherein the first one of the first plurality of prioritized parallel PN correlation branches comprises:
   a substantially zero PN-chip delay unit;
   a first PN despreader coupled to the substantially zero PN-chip delay unit;
   a first accumulator coupled to the first PN despreader;
   a first symbol rate sampler coupled to the first accumulator; and
   a first sample weighting summer.

4. A TDMA-SS signal prioritization system as in claim 3 wherein the second one of the first plurality of prioritized parallel PN correlation branches comprises:
   a Hub N-chip delay unit, wherein the Hub N-chip delay unit is adapted to correspond to the second prioritized PN encoded signal, where N is an integer variable;
   a second PN despreader coupled to the Hub N-chip delay unit;
   a second accumulator coupled to the second PN despreader;
   a second symbol rate sampler coupled to the second accumulator; and
   a second sample weighting summer.

5. A TDMA-SS signal prioritization system as in claim 4 further comprising a weighting controller coupled to the first symbol rate sampler, the second symbol rate sampler, the first sample weighting summer, and the second sample weighting summer, wherein the weighting controller is adapted to zero weight at least one of the first plurality of parallel PN correlation branches.

6. A TDMA-SS signal prioritization system as in claim 1 wherein the second Spoke transmitter comprises:
   at least one Spoke N-chip delay unit, wherein N is an integer variable, wherein the at least one Spoke N-chip delay unit is adapted to delay the second prioritized PN encoded signal to correspond to the second one of the plurality of prioritized parallel PN correlation branches.

7. A TDMA-SS signal prioritization system as in claim 6 wherein the at least one Spoke N-chip delay unit comprises a 3-chip delay unit.

8. A TDMA-SS signal prioritization system as in claim 6 wherein the second Spoke transmitter further comprises:
   a plurality of Spoke N-chip delay units series connected, the plurality of Spoke N-chip delay units series connected having a plurality of priority taps; and
   a priority selector coupled to one of the plurality of priority taps.

9. A TDMA-SS signal prioritization system as in claim 8 wherein each of the plurality of Spoke N-chip delay units comprises a 3-chip delay unit.

10. A method for selecting a prioritized TDMA-SS signal, the method comprising:
    In at least one Spoke, Spoke prioritizing a TDMA-SS signal;
    In a Hub:
       accumulating the prioritized TDMA-SS signal, wherein accumulating the prioritized TDMA-SS signal comprises:
          delaying the prioritized TDMA-SS signal by a first PN chip;
          despreading the first PN chip delayed prioritized TDMA-SS signal;
       determining a detection threshold;
       comparing the accumulated prioritized TDMA-SS signal to the detection threshold; and
       determining a priority of the accumulated prioritized TDMA-SS signal in accordance with a result of the comparison.

11. A method as in claim 10 wherein delaying the prioritized TDMA-SS signal by a first PN chip further comprises:
    parallel chip delaying the prioritized TDMA-SS signal by a plurality of second PN chips; and
    parallel despreading the prioritized TDMA-SS signals delayed by the plurality of second PN chips.

12. A method as in claim 11 wherein parallel chip delaying the prioritized TDMA-SS signal by the plurality of second PN chips further comprises:
    delaying the prioritized TDMA-SS signal by the first PN chip +1 delayer; and
    delaying the prioritized TDMA-SS signal by the first PN chip −1 delayer.

13. A method as in claim 10 wherein Spoke prioritizing a TDMA-SS signal comprises
    providing a PN code;
    delaying the PN code in accordance with a predetermined priority;
    modulating data with the delayed PN code; and
    transmitting the modulated data.

14. A method as in claim 13 wherein delaying the PN code in accordance with the predetermined priority further comprises delaying the PN code in accordance with:

$$\text{delay}=(P-1)\times(\text{CD}),$$

where
P is an integer variable representing priority,
CD is an integer variable representing chip delay units.

15. A method as in claim 14 further comprising setting CD=3 chip delay units.

16. A program storage device readable by a machine, tangibly embodying a program of instructions executable by the machine to perform method steps for generating TDMA-SS signal prioritization and collision mitigation, the method comprising the steps of:

In at least one Spoke, Spoke prioritizing a TDMA-SS signal;

In a Hub:
   accumulating the prioritized TDMA-SS signal, wherein accumulating the prioritized TDMA-SS signal comprises:
      delaying the prioritized TDMA-SS signal by a first PN chip;
      despreading the first PN chip delayed prioritized TDMA-SS signal;
   determining a detection threshold;
   comparing the accumulated prioritized TDMA-SS signal to the detection threshold; and
   determining a priority of the accumulated prioritized TDMA-SS signal in accordance with a result of the comparison.

17. A program storage device as in claim 16 wherein the program of instructions comprise at least one Very High Speed Integrated Circuit (VHSIC) Hardware Description (VHDL) Language file.

* * * * *